US012508365B2

(12) United States Patent
Juster et al.

(10) Patent No.: US 12,508,365 B2
(45) Date of Patent: Dec. 30, 2025

(54) SITE TRACKING BASED ON CONNECTIVITY IN INFUSION PUMP SYSTEMS

(71) Applicant: Tandem Diabetes Care, Inc., San Diego, CA (US)

(72) Inventors: Josh Juster, San Diego, CA (US); Geoffrey Kruse, San Diego, CA (US)

(73) Assignee: TANDEM DIABETES CARE, INC., San Diego, CA (US)

( * ) Notice: Subject to any disclaimer, the term of this patent is extended or adjusted under 35 U.S.C. 154(b) by 0 days.

(21) Appl. No.: 18/896,045

(22) Filed: Sep. 25, 2024

(65) Prior Publication Data

US 2025/0099679 A1    Mar. 27, 2025

Related U.S. Application Data

(60) Provisional application No. 63/604,003, filed on Nov. 29, 2023, provisional application No. 63/585,086, filed on Sep. 25, 2023.

(51) Int. Cl.
*A61M 5/172*       (2006.01)
*A61B 5/145*       (2006.01)

(52) U.S. Cl.
CPC ....... *A61M 5/1723* (2013.01); *A61B 5/14532* (2013.01); *A61M 2205/3553* (2013.01); *A61M 2205/502* (2013.01)

(58) Field of Classification Search
CPC ........ G16H 40/60; G16H 40/63; G16H 40/67; G16H 20/40; G16H 40/00; G16H 50/00; G16H 50/30; G16H 80/00; A61M 2205/35; A61M 2205/3546; A61M 2205/3553; A61M 2205/3561; A61M 2205/3569; A61M 2205/3576; A61M 2205/3584; A61M 2205/3592; A61M 5/1723; A61M 5/172; A61M 2005/1726; A61M 2205/33; A61M 2205/3303; A61M 2205/50; A61M 2205/502; A61M 2205/52; A61M 5/14244; A61M 2005/14268; A61M 2205/70;
(Continued)

(56) References Cited

U.S. PATENT DOCUMENTS 7,653,425 B2   1/2010  Hayter et al.
7,920,907 B2   4/2011  McGarraugh et al.
(Continued)

FOREIGN PATENT DOCUMENTS

WO   2017124099 A1   7/2017

OTHER PUBLICATIONS

International Search Report and Written Opinion, Application No. PCT/US2024/048441, dated Dec. 31, 2024.

*Primary Examiner* — Jason E Flick
(74) *Attorney, Agent, or Firm* — Merchant & Gould P.C.

(57) ABSTRACT

Enclosed herein are methods and systems for establishing communication protocols between wireless devices in infusion pump systems. Infusion pump systems can include a number of components capable of wireless communication with one or more other components including an infusion pump, a continuous glucose monitoring (CGM) system, and a smartphone or other multi-purpose consumer electronic device (i.e., remote control device). Communications among these devices can be coordinated to ensure reliable and consistent transmission of medical data.

20 Claims, 9 Drawing Sheets

(58) Field of Classification Search
CPC .............. A61B 5/14532; A61B 5/4839; A61B 2560/045; A61B 2560/0487; A61B 5/0002; A61B 5/0015; A61B 5/0024; A61B 5/1495; A61B 5/7221; A61B 5/72; A61B 5/742; A61B 5/743; A61B 5/744; H04B 7/24; H04B 7/26; H04W 24/00; H04W 24/08; H04W 24/02; H04W 24/04; H04W 52/0241; H04W 52/0225; H04W 52/0245; H04W 52/0229; H04W 76/19
See application file for complete search history.

(56) References Cited

U.S. PATENT DOCUMENTS

| | | | |
|---|---|---|---|
| 7,928,850 B2 | 4/2011 | Hayter et al. | |
| 7,996,158 B2 | 8/2011 | Hayter et al. | |
| 8,121,857 B2 | 2/2012 | Galasso et al. | |
| 8,344,847 B2 | 1/2013 | Moberg et al. | |
| 8,456,301 B2 | 6/2013 | Fennell et al. | |
| 8,461,985 B2 | 6/2013 | Fennell et al. | |
| 9,089,305 B2 | 7/2015 | Hovorka | |
| 9,421,324 B2 | 8/2016 | Sloan | |
| 9,549,324 B2 | 1/2017 | Birtwhistle et al. | |
| 10,492,141 B2 | 11/2019 | Kruse | |
| 10,588,575 B2 | 3/2020 | Gottlieb et al. | |
| 10,736,037 B2 | 8/2020 | Kruse et al. | |
| 2007/0255348 A1 | 11/2007 | Holtzclaw | |
| 2008/0004601 A1 | 1/2008 | Jennewine et al. | |
| 2009/0164239 A1 | 6/2009 | Hayter et al. | |
| 2010/0185175 A1 | 7/2010 | Kamen et al. | |
| 2010/0295686 A1 | 11/2010 | Sloan et al. | |
| 2010/0298685 A1 | 11/2010 | Hayter et al. | |
| 2011/0009725 A1 | 1/2011 | Hill et al. | |
| 2011/0044333 A1 | 2/2011 | Sicurello et al. | |
| 2011/0053121 A1 | 3/2011 | Heaton | |
| 2011/0098548 A1 | 4/2011 | Budiman et al. | |
| 2011/0130746 A1 | 6/2011 | Budiman | |
| 2011/0149759 A1 | 6/2011 | Jollota | |
| 2011/0152970 A1 | 6/2011 | Jollota et al. | |
| 2013/0060105 A1 | 3/2013 | Shah et al. | |
| 2014/0012511 A1 | 1/2014 | Mensinger et al. | |
| 2014/0180203 A1 | 6/2014 | Budiman et al. | |
| 2014/0187890 A1 | 7/2014 | Mensinger et al. | |
| 2015/0273147 A1 | 10/2015 | Duke et al. | |
| 2015/0289823 A1 | 10/2015 | Rack-Gomer et al. | |
| 2015/0352282 A1 | 12/2015 | Mazlish | |
| 2016/0098848 A1 | 4/2016 | Zamanakos et al. | |
| 2016/0328991 A1 | 11/2016 | Simpson et al. | |
| 2018/0042559 A1 | 2/2018 | Cabrera, Jr. et al. | |
| 2020/0206420 A1 | 7/2020 | Michaud | |
| 2020/0372995 A1 | 11/2020 | Kruse et al. | |
| 2021/0113766 A1 | 4/2021 | Kearns et al. | |
| 2021/0128831 A1* | 5/2021 | Zade | G16H 40/67 |
| 2023/0034408 A1 | 2/2023 | Nichols et al. | |
| 2025/0099674 A1 | 3/2025 | Kruse et al. | |
| 2025/0108162 A1 | 4/2025 | Kruse et al. | |

* cited by examiner

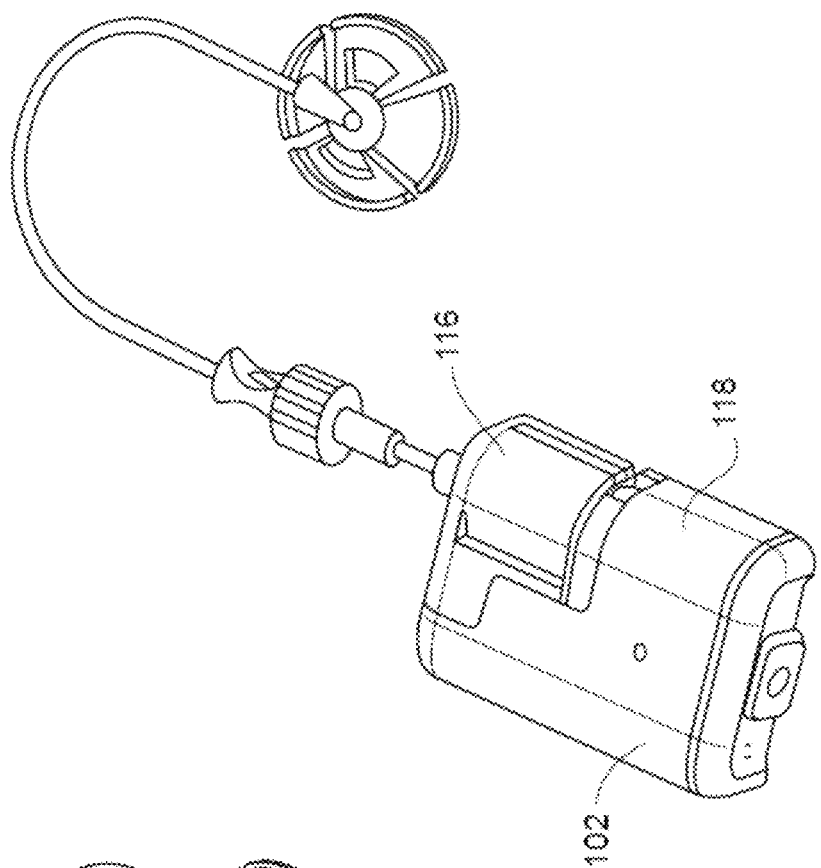
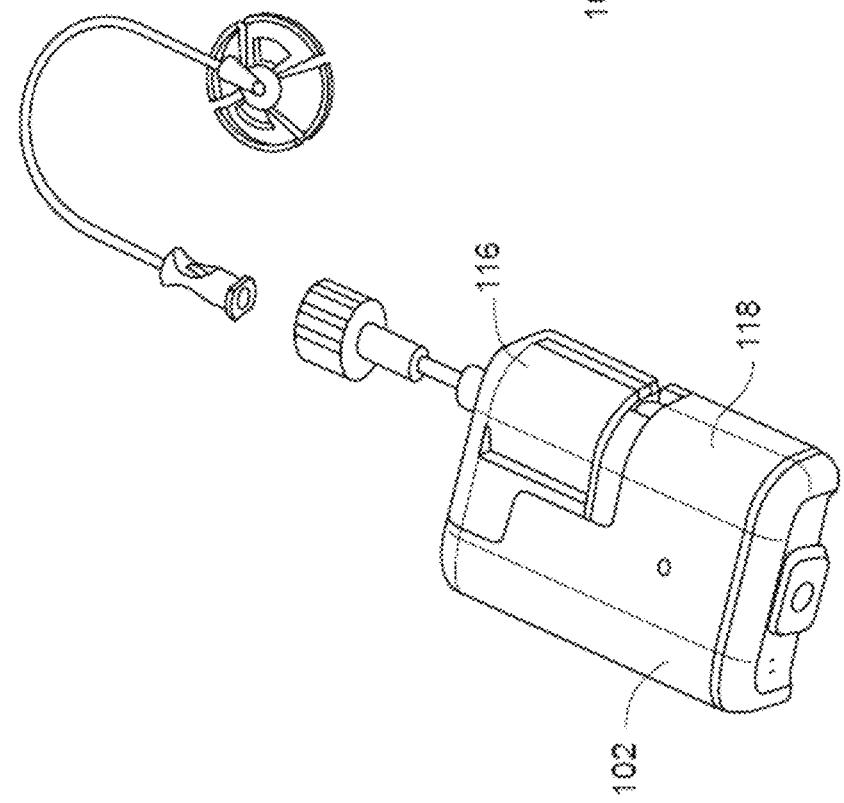

SITE TRACKING BASED ON CONNECTIVITY IN INFUSION PUMP SYSTEMS

PRIORITY CLAIM

This application claims the benefit of U.S. Provisional Applications Nos. 63/585,086 and 63/604,003, each of which is hereby incorporated herein by reference in its entirety.

TECHNICAL FIELD

The present disclosure is directed to portable infusion pumps and more particularly to wireless communications in infusion pump systems.

BACKGROUND

There are a wide variety of medical treatments that include the administration of a therapeutic fluid in precise, known amounts at predetermined intervals. Devices and methods exist that are directed to the delivery of such fluids, which may be liquids or gases, are known in the art.

One category of such fluid delivery devices includes insulin injecting pumps developed for administering insulin to patients afflicted with type 1, or in some cases, type 2 diabetes. Some insulin injecting pumps are configured as portable or ambulatory infusion devices and can provide continuous subcutaneous insulin injection and/or infusion therapy as an alternative to multiple daily injections of insulin via a syringe or an insulin pen. Such pumps are worn by the user and may use replaceable cartridges. In some embodiments, these pumps may also deliver medicaments other than, or in addition to, insulin, such as glucagon, pramlintide, and the like. Examples of such pumps and various features associated therewith include those disclosed in U.S. Pat. Publ. Nos. 2013/0324928 and 2013/0053816 and U.S. Pat. Nos. 8,287,495; 8,573,027; 8,986,253; and 9,381,297, each being incorporated herein by reference in its entirety.

Ambulatory infusion pumps have generally been controlled by a user interface provided on the pump. With the proliferation of handheld electronic devices, such as mobile phones (e.g., smartphones), there is a desire to be able to remotely utilize such devices, as well as dedicated wireless controllers designed to work with one or more infusion pumps and/or types of infusion pumps, to optimize usage of infusion pumps. These remote controllers would enable a pump to be monitored, programmed and/or operated more privately, more conveniently and more comfortably. Accordingly, one potential use of dedicated remote devices and handheld consumer electronic devices (such as smartphones, tablets and the like) is to utilize such devices as controllers for remotely programming and/or operating infusion pumps.

In addition to mobile control devices such as smartphones and dedicated remote controllers, it may be beneficial to enable infusion pumps to communicate with other devices, such as continuous glucose monitors, glucose meters, and other health monitoring devices, for example. However, wireless communications are subject to interference for a number of reasons and therefore relying on wireless communication for medical therapy may pose some disadvantages as well. Furthermore, it can be difficult to determine an optimal location of where to place an infusion pump that allows for reliable and consistent communication with a medical therapy device such as those described previously.

Conventional solutions of guessing locations having reliable and consistent communication are inaccurate and can result in the loss of medical data needed to make informed treatment decisions. It would therefore be desirable to configure such communications to reduce the risk of important medical data not being transmitted due to communication issues.

SUMMARY

Enclosed herein are methods and systems for establishing communication protocols between wireless devices in infusion pump systems. Infusion pump systems can include a number of components capable of wireless communication with one or more other components including an infusion pump, a continuous glucose monitoring (CGM) system, and a smartphone or other multi-purpose consumer electronic device (i.e., remote control device). Communications among these devices can be coordinated to ensure reliable and consistent transmission of medical data.

In embodiments, methods of coordinating wireless communications in an infusion pump system including a continuous glucose monitoring (CGM) device and an infusion pump are provided. Initially, a communication session can be initiated between the infusion pump and the CGM device to enable the CGM device to transmit CGM data to the infusion pump. There can be a subsequent determination or verification that the communication session has in fact been initiated and the infusion pump is now communicatively coupled to the CGM device. After determining that the communication session is initiated, a metric indicating communication signal quality between the infusion pump and the CGM device based on a first location of the infusion pump relative to the CGM device or vice versa can be determined. The metric indicating communication signal quality between the infusion pump and the CGM device can be recorded for optional use by the infusion pump system at a later time. An indication of signal quality at one or more other locations can also optionally be displayed. The indication of one or more other locations can be based on the first location of the infusion pump relative to the CGM device or vice versa.

In embodiments, if the communication signal strength between the infusion pump and the CGM device is below a pre-defined threshold, a recommendation to relocate at least one of the infusion pump and the CGM device to a different location can be sent to a user. In embodiments, a metric indicating communication signal quality between the infusion pump and the CGM device based on a second location of the infusion pump relative to the CGM device or vice versa can be relayed in a manner similar to that of the first metric. The metric can be recorded for optional use by the infusion pump system at a later time. In embodiments, the indication of communication signal quality at one or more other locations can be updated based on the second location of the infusion pump relative to the CGM device or vice versa.

In embodiments, a method of coordinating wireless communications in an infusion pump system including a continuous glucose monitoring (CGM) device and an infusion pump can include initiating a communication session between the infusion pump and the CGM device, determining that the infusion pump is communicatively coupled to the CGM device and determining a metric indicating communication signal quality between the infusion pump and the CGM device based on a first location of the infusion pump and a first location of the CGM device relative to a user's body.

In embodiments, a method of coordinating wireless communications in an infusion pump system including a continuous glucose monitoring (CGM) device and an infusion pump can include receiving input through a user interface from a user initiating a communication session between the infusion pump and the CGM device and providing guidance on the user interface to the user on where to position at least one of the infusion pump and the CGM device relative to the user's body based on a measure of signal strength between the infusion pump and the CGM device.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 3A-3B depict an embodiment of an infusion pump system according to the disclosure.

Figure 1:
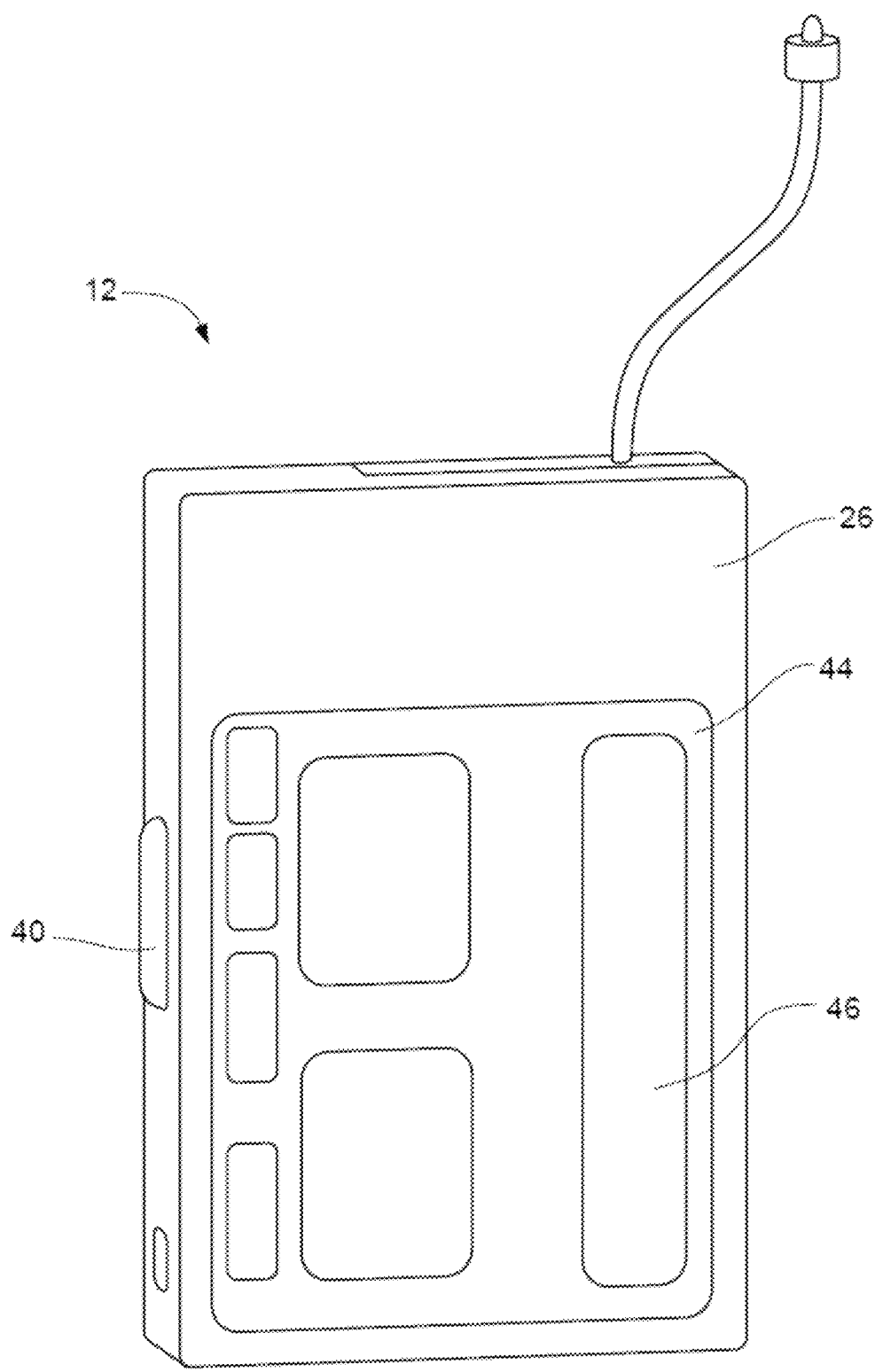
FIG. 1 depicts an embodiment of an infusion pump system according to the disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following detailed description should be read with reference to the drawings in which similar elements in different drawings are numbered the same. The drawings, which are not necessarily to scale, depict illustrative embodiments and are not intended to limit the scope of the invention.

FIG. 1 depicts an exemplary medical device that can be used with embodiments of the disclosure. In this embodiment, the medical device is configured as a pump 12, such as an infusion pump, that can include a pumping or delivery mechanism and reservoir for delivering medicament to a patient and an output/display 44. The type of output/display 44 may vary as may be useful for a particular application. The output/display 44 may include an interactive and/or touch sensitive screen 46 having an input device such as, for example, a touch screen comprising a capacitive screen or a resistive screen. The pump 12 may additionally include a keyboard, microphone, or other input device known in the art for data entry, which may be separate from the display. The pump 12 may also include a capability to operatively couple to one or more blood glucose meters (BGMs) or continuous blood glucose monitors (CGMs) and/or one or more secondary devices such as a remote display, a remote control device, a laptop computer, personal computer, tablet computer, a mobile communication device such as a smartphone, a wearable electronic watch, smart ring, electronic health or fitness monitor, or personal digital assistant (PDA), a CGM display etc.

In one embodiment, the medical device can be a portable pump configured to deliver insulin to a patient. Further details regarding such pump devices can be found in U.S. Pat. No. 8,287,495, which is incorporated herein by reference in its entirety. In other embodiments, the medical device can be an infusion pump configured to deliver one or more additional or other medicaments to a patient.

Figure 2:
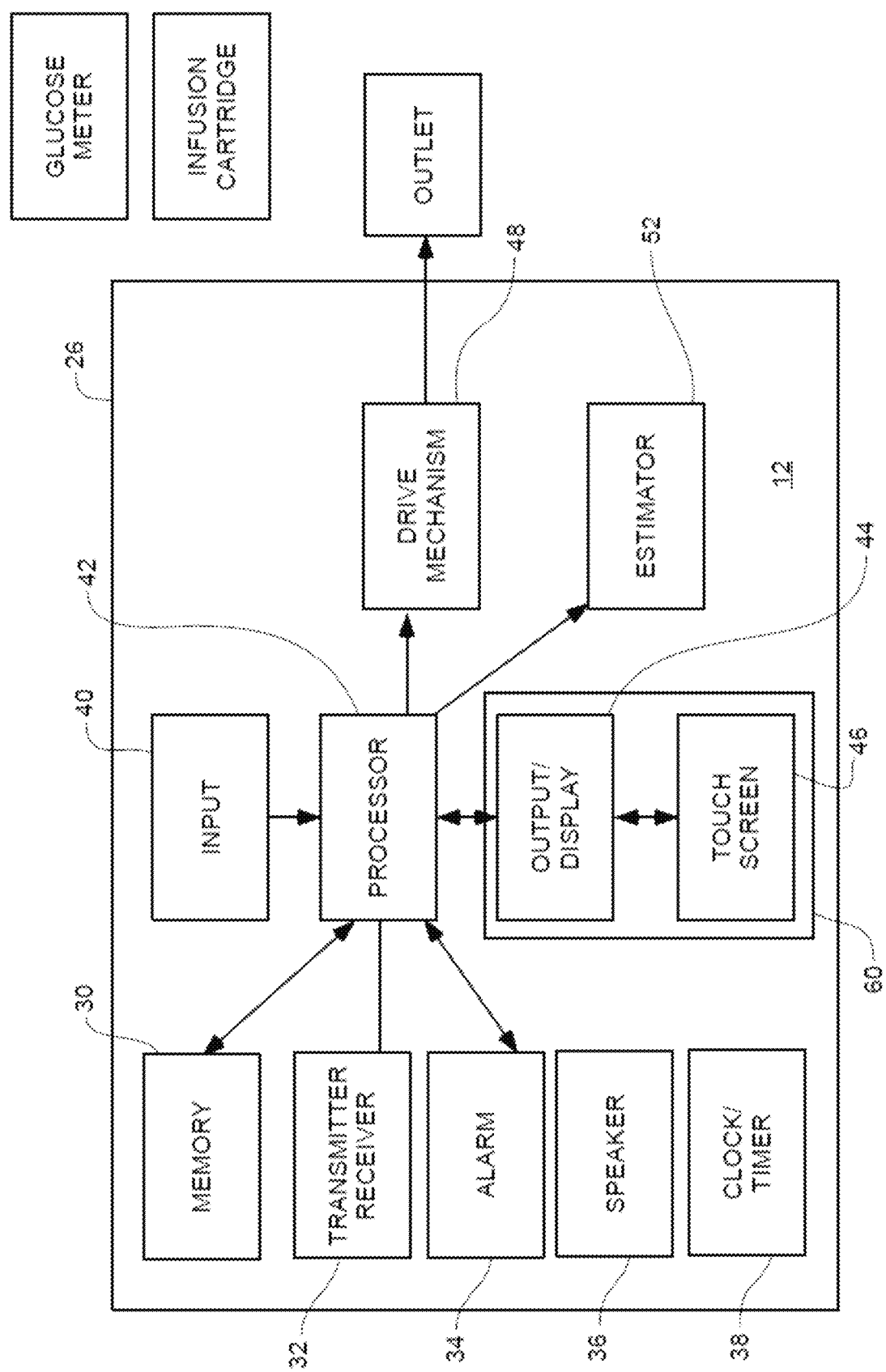
FIG. 2 depicts a block diagram representing an embodiment of an infusion pump system according to the disclosure.

FIG. 2 illustrates a block diagram of some of the features that can be used with embodiments, including features that may be incorporated within the housing 26 of a medical device such as a pump 12. The pump 12 can include a processor 42 that controls the overall functions of the device. The infusion pump 12 may also include, e.g., a memory device 30, a transmitter/receiver 32, an alarm 34, a speaker 36, a clock/timer 38, an input device 40, a user interface suitable for accepting input and commands from a user such as a caregiver or patient, a drive mechanism 48, an estimator device 52, and a microphone (not pictured). One embodiment of a user interface as shown in FIG. 2 is a graphical user interface (GUI) 60 having a touch sensitive screen 46 with input capability. In some embodiments, the processor 42 may communicate with one or more other processors within the pump 12 and/or one or more processors of other devices, for example, a continuous glucose monitor (CGM), display device, smartphone, etc. through the transmitter/receiver. The processor 42 may also include programming that may allow the processor 42 to receive signals and/or other data from one or more input devices, such as sensors that may sense pressure, temperature and/or other parameters.

FIGS. 3A-3B depict a second infusion pump that can be used in conjunction with one or more embodiments of the ambulatory infusion pump system of the present disclosure. Pump 102 includes a pump drive unit 118 and a medicament cartridge 116. Pump 102 includes a processor 42 that may communicate with one or more processors within the pump 102 and/or one or more processors of other devices such as a remote device (e.g., a CGM device), a remote control device, or a consumer electronic device (e.g., laptop computer, personal computer, tablet computer, smartphone, electronic watch, smart ring, electronic health or fitness monitor, or personal digital assistant). The processor 42 may also include programming to receive signals and/or other data from an input device, such as, by way of example, a pressure sensor, a temperature sensor, or the like. Pump 102 also includes a processor that controls some or all of the operations of the pump. In some embodiments, pump 102 receives commands from a separate device for control of some or all of the operations of the pump. Such separate device can include, for example, a dedicated remote device or a consumer electronic device such as a smartphone having a processor executing an application configured to enable the device to transmit operating commands to the processor 42 of pump 102. In some embodiments, processor 42 can also transmit information to one or more separate devices, such as information pertaining to device parameters, alarms, reminders, pump status, etc. Such separate device can include any remote display, remote device, remote control, or a consumer electronic device as described previously.

Pump 102 can also incorporate any or all of the features described with respect to pump 12 in FIG. 2. In some embodiments, the communication is effectuated wirelessly, by way of example only, via a near field communication (NFC) radio frequency (RF) transmitter or a transmitter operating according to a "Wi-Fi" or Bluetooth® protocol, Bluetooth® low energy protocol or the like. Further details regarding such pumps can be found in U.S. Pat. No. 10,279,106 and U.S. Patent Publication Nos. 2016/0339172 and 2017/0049957, each of which is hereby incorporated herein by reference in its entirety.

Figure 4:
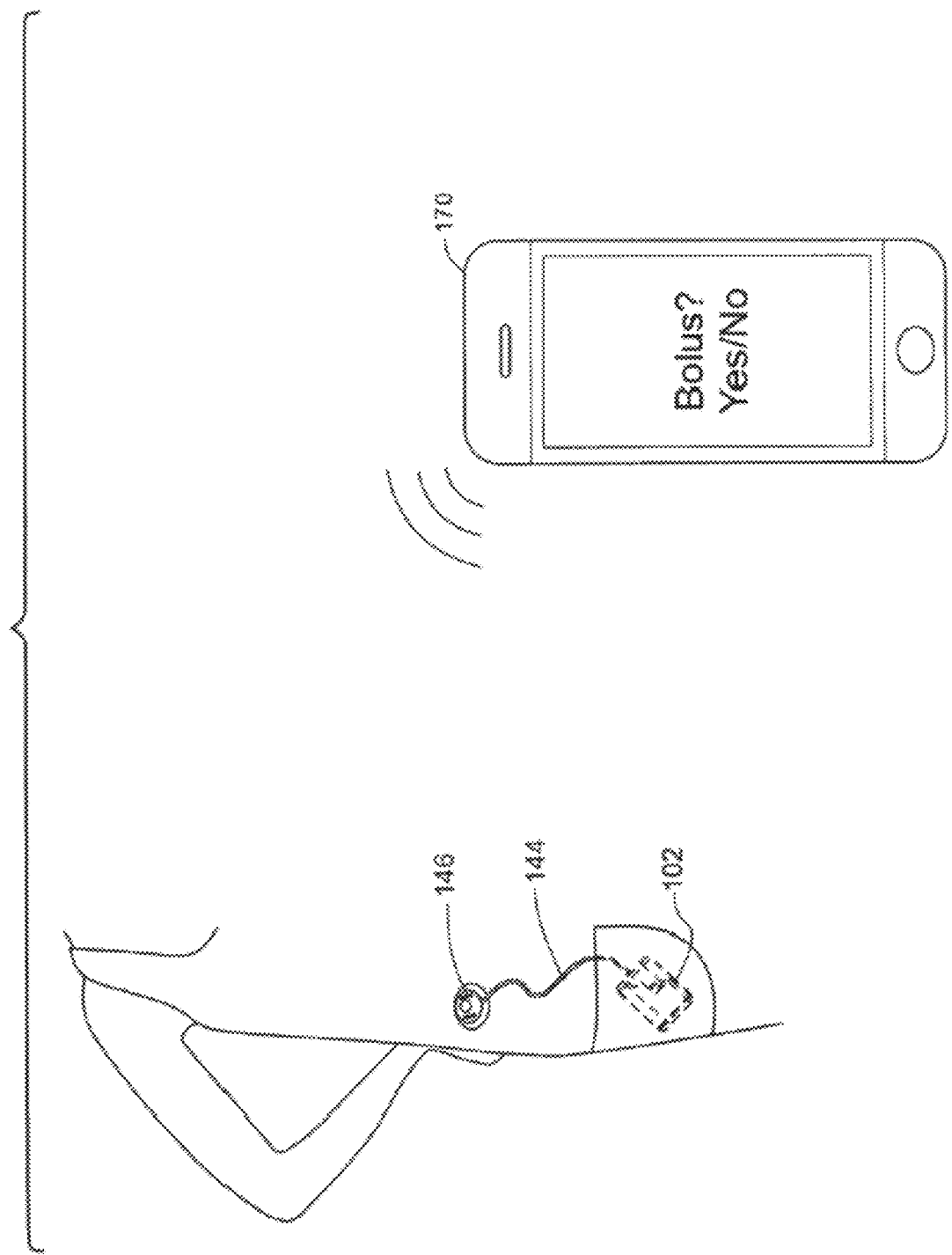
FIG. 4 depicts an embodiment of an infusion pump system according to the disclosure.
Figure 5B:
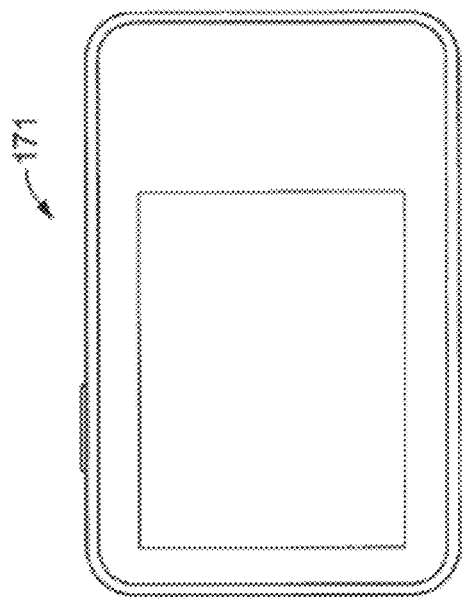
FIGS. 5A-5B depict remote control devices for an infusion pump system according to embodiments of the disclosure.
Figure 5A:
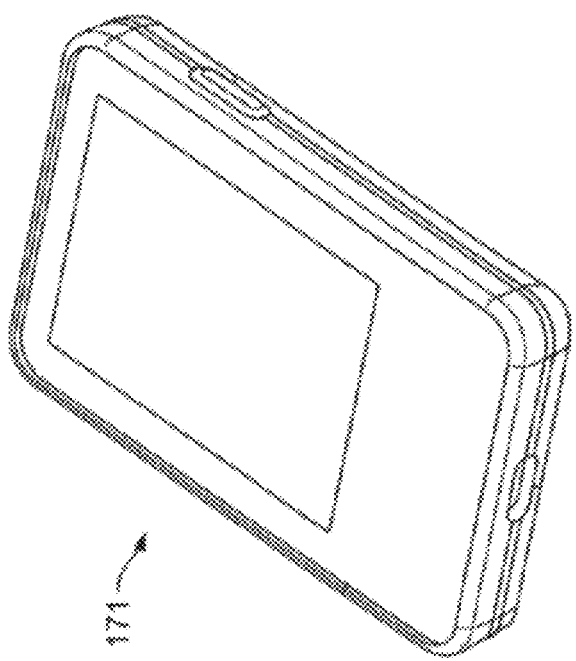

Referring to FIGS. 4-5B, one or more remote devices 170, 171 can be used to communicate with the processor 42 of pump 12 and/or pump 102 to control delivery of medicament and transfer data with pump 12/102 via a wired or a wireless electromagnetic signal, such as via, e.g., a near field communication (NFC) radio frequency (RF) modality or other RF modalities such as Bluetooth®, Bluetooth® low energy, mobile or Wi-Fi communication protocols, for example, according to embodiments of the present disclosure. Such a remote device can include, for example, a mobile communication device 170, such as a smart phone (as depicted in FIG. 4) executing a software application for control of the pump 12/102, a dedicated remote controller 171 (as depicted in FIGS. 5A-5B), a wearable electronic watch, smart ring, electronic health or fitness monitor or personal digital assistant (PDA), etc., or a tablet, laptop or personal computer. Such communications between (and among) the one or more remote devices 170, 171 and pump 12/102 may be one-way or two-way for, e.g., effective transfer of data among the devices and the pump, control of pump operations, updating software on the devices and/or pump, and allowing pump-related data to be viewed on the devices and/or pump.

Figure 6:
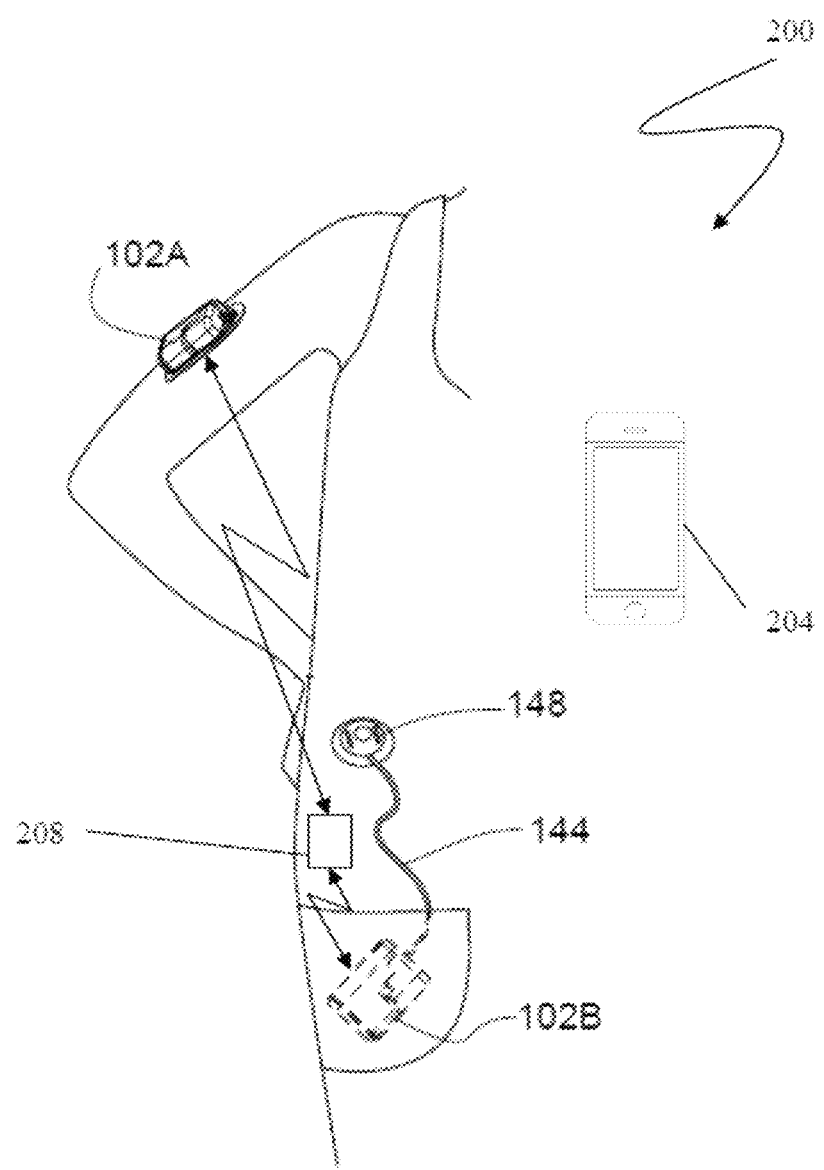
FIG. 6 depicts a schematic representation of an infusion pump system according to an embodiment of the disclosure.

FIG. 6 depicts a schematic representation of pump system 200 according to an embodiment of the disclosure. System 200 includes a user-wearable infusion pump such as pump 12 or pump 102 described above. In embodiments, a user can alternatively wear the pump 102A directly on the body or place the pump 102B in the user's pocket or other location near the body with infusion tubing 144 extending to an infusion set 148 on the user's body. The system 200 also includes a continuous glucose monitoring (CGM) sensor with a corresponding transmitter 208. The CGM sensor obtains measurements relating to glucose levels in the body and the transmitter communicates that information to pump 102A/B. Pump 208 can then use the glucose data in making therapy determinations. The system can also include a one or more devices such as a smartphone 204 or other multi-purpose consumer electronic device capable of operating a software application to communicate with and/or control the pump and, alternatively or additionally, a dedicated remote device designed specifically for use with pump 102A/102B. The smartphone 204 or other remote device can in some embodiments also be capable of communication with CGM sensor/transmitter 208. In addition, the t pump 102A/B and/or smartphone 204 or other remote device can optionally communicate with additional devices such as, for example, a blood glucose meter or other analyte sensing device, an activity or other health monitor, etc.

Although depicted with the multi-purpose consumer electronic device 204 being a smartphone, in various embodiments the consumer electronic device can alternatively or additional include one or more of a wearable electronic watch, such as a smartwatch, a smart ring, electronic health or fitness monitor, personal digital assistant (PDA), or a tablet, laptop or personal computer, etc. A multi-purpose consumer electronic device 204 can be any device sold to consumers and used for a variety of functions and which can be configured or programmed to communicate with and/or control an infusion pump as one of said functions. In some embodiments, systems as described herein may include more than one multi-purpose consumer electronic device 204 configured for communication with the infusion pump (e.g., a smartphone and a smart watch).

The devices in the pump system 200 of FIG. 6 can communicate using any wireless communication modality known in the art. In some embodiments, the devices communicate via Bluetooth®. In the embodiment depicted in FIG. 6, Bluetooth® communications between the pump 102A/102B and the CGM sensor/transmitter 208 will generally be stable because the devices are positioned relatively close to each other and on generally the same side of the body. However, it is well known that Bluetooth® and other radio signals are disrupted and cannot be reliably received through water. Because the human body is primarily comprised of water, Bluetooth® signals cannot be reliably transmitted and received through the body. As such, there is a risk in systems such as those depicted in FIG. 6 (in which a CGM sensor/transmitter is worn on the body and an infusion pump is worn on or in close proximity to the body) that the body could interfere with the Bluetooth® or other signals sending information from the CGM sensor/transmitter to the pump. This signal interference could have significant medical consequences in systems that depend on the CGM data for making proper therapy determinations.

Figure 7:
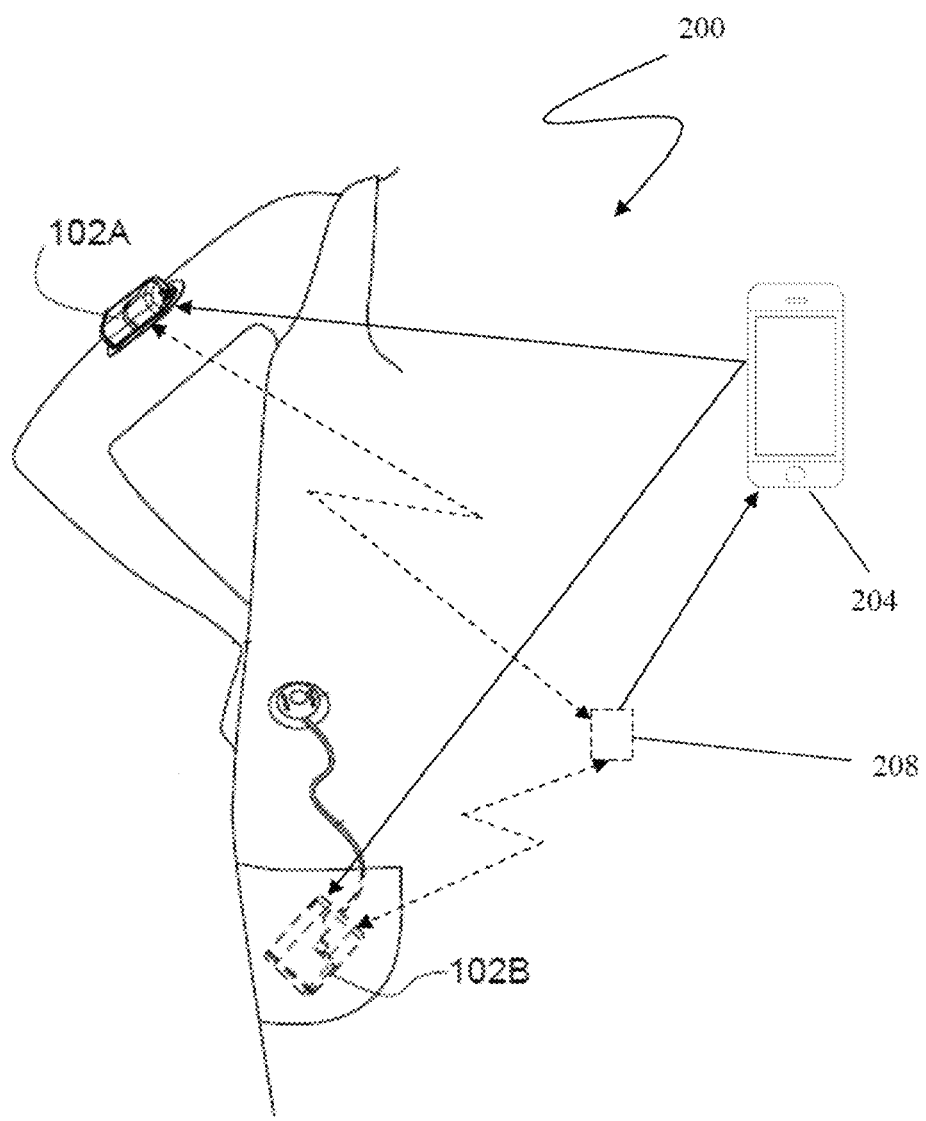
FIG. 7 depicts a schematic representation of an infusion pump system according to an embodiment of the disclosure.

Referring to FIG. 7, an embodiment of a configuration of system 200 in which such signal interference could occur is depicted. In the depicted configuration, the CGM sensor/transmitter 208 is positioned on the rear of the user's body (as indicated by the dashed lines) and on the opposite side of the body from the pump 102A/102B. Because Bluetooth® signals cannot reliably be transmitted through the body, it may be difficult for the pump 102A/B to receive a stable signal from the CGM and there may be periods of time where no signal is received.

In a system such as those depicted in FIGS. 6-7 that incorporates a smartphone or other remote device 204, the remote device 204 can be employed to remedy any connection issues between the pump and CGM. If the pump 102A/B is not receiving the CGM data from the CGM sensor/transmitter 208, the remote device 204 can receive the data and then relay the data to the pump 102A/B. In various embodiments, the remote device 204 can make the determination that the pump is not receiving the data by, for example, (1) the remote device 204 regularly communicating with the pump 102A/B to ensure the pump is receiving the CGM data, (2) the pump 102A/B notifying the remote device 204 when the pump is not receiving the data, and/or (3) the CGM sensor/transmitter 208 communicating with the remote device 204 to notify the remote device that the CGM data is not being received by the pump 102A/B. In various embodiments, the remote device 204 can communicate with the CGM sensor/transmitter 208 to request the CGM data when the pump is not receiving the data or the CGM sensor/transmitter 208 automatically sends the CGM data to the remote device 204 to relay to the pump 102A/102B. In some embodiments, the remote device 204 may be generally continually receiving the CGM data from the CGM sensor/transmitter 208, but only relays the data to the pump 102A/102B when it is determined that the pump is not reliably receiving the CGM data by one of the aforementioned methods. As noted above, although the remote device 204 is depicted as a smartphone or other various devices (e.g., smartwatch, smart ring, etc.) can be employed to aid in relaying data between a pump and CGM.

CGM data as described herein can include glucose level and trend data that may be used by the pump in making therapy determination, but other data transmitted from the CGM sensor/transmitter to the pump could also be relayed. For example, one or more of diagnostic data such as battery life, sensor performance metrics, sensor algorithm information, therapy or dosing recommendations from the sensor, calibration requests or information, low battery reminders, etc. could also be relayed.

Figure 8:
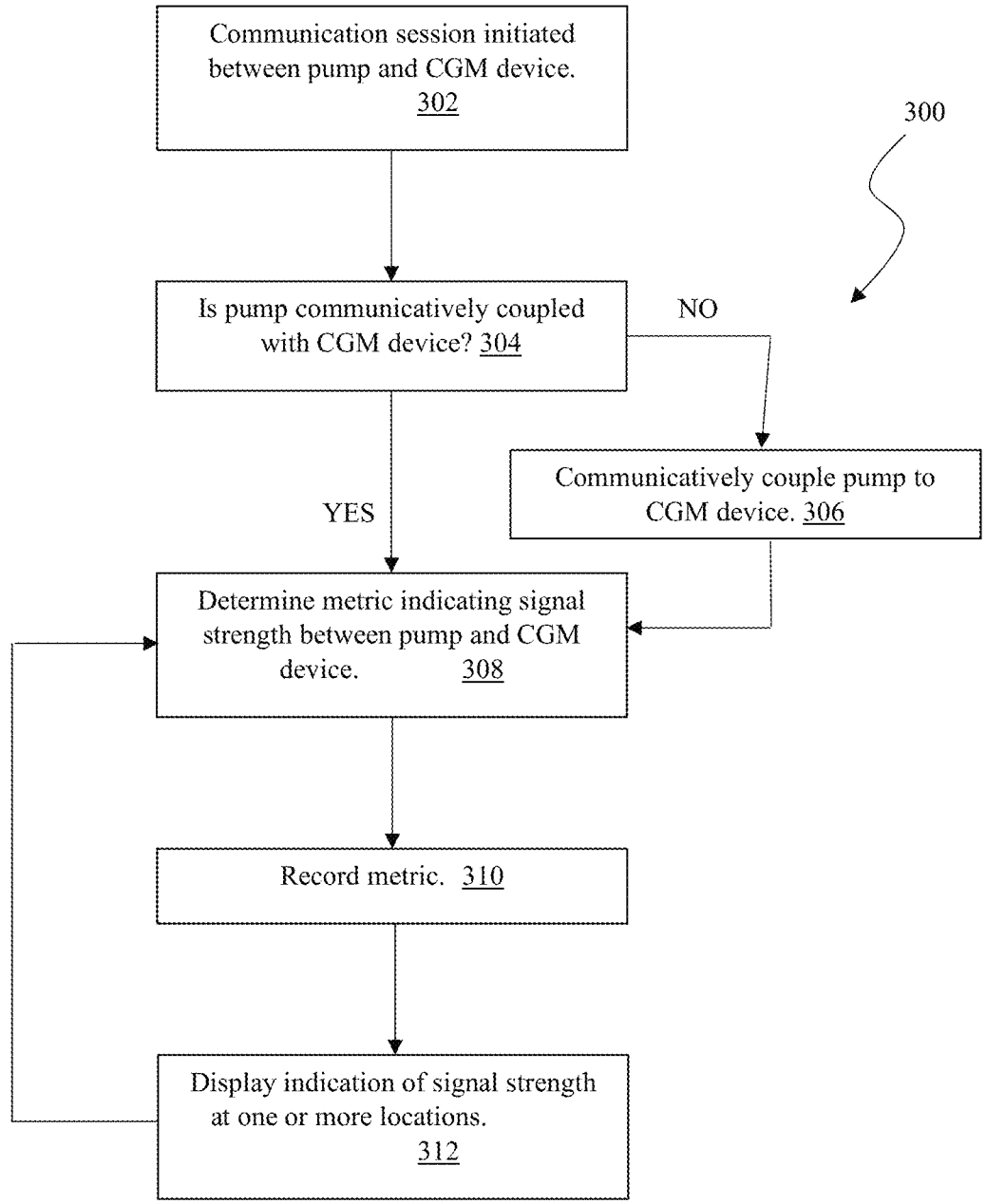
FIG. 8 depicts a flowchart of methods steps for managing wireless communications in an infusion pump system according to an embodiment of the disclosure.

Referring now to FIG. 8, a flowchart of method steps for a method 300 of coordinating wireless communications in an infusion pump system is depicted according to an embodiment of the disclosure. At 302, a communication session between an infusion pump and a CGM device can be initiated, via Bluetooth® or another suitable communications protocol. At 304, there can be a subsequent determination or verification that the communication session has in fact been initiated and the infusion pump is now communicatively coupled to the CGM device. If it is determined that the infusion pump is not communicatively coupled to the CGM device, the infusion pump and the CGM device are then communicatively coupled together at 306. At 308, a metric indicating communication signal strength between the infusion pump and the CGM device is relayed, the metric being based on a first location with respect to the user's body of the infusion pump relative to the CGM device or vice versa.

At 310, the metric indicating communication signal strength between the infusion pump and the CGM device can be recorded. Optionally, the metric is saved in a memory unit of the infusion pump system for use at a later time. At 312, an indication of signal strength at one or more other locations above a pre-defined threshold can optionally be displayed. As noted below, in some embodiments, these indications are displayed only if the signal strength at the current location is below such a pre-defined threshold. In embodiments, the indication of one or more other locations is based on the first location of the infusion pump relative to the CGM device or vice versa with respect to the user's body.

In embodiments, if the communication signal strength between the infusion pump and the CGM device is below a pre-defined threshold (i.e., the signal strength is weak), a recommendation to relocate at least one of the infusion pumps and the CGM device to a different location can be sent to a user of the system. As noted below, in some embodiments the recommendation can include a graphical representation displayed of the user's body on a user interface indicating the different location. If the communication signal strength is above a pre-defined threshold (i.e., the signal strength is strong), a notification that the infusion pump and the CGM device are adequately positioned can be sent to the user. The notification can be a message using words and/or numbers, a color-coded indication, a symbol, or any other indication form understandable to a user of the system.

Optionally, a metric indicating communication signal strength between the infusion pump can be relayed, the metric being based on a second location of the infusion pump relative to the CGM device or vice versa. The metric indicating communication signal strength between the infusion pump and the CGM device can be recorded in a similar manner as with the first metric. In embodiments, the indication of a communication signal strength at one or more other locations can be updated based on the second location of the infusion pump relative to the CGM device or vice versa.

The methods and systems disclosed herein can be used to guide a user where to place an infusion pump based on communication signal quality between an infusion pump and a CGM device (e.g., to alleviate connectivity issues associated with Bluetooth® and the human body and/or connectivity issues due to other reasons). This can be achieved by tracking location data associated with past and present locations of the infusion pump and/or the CGM device which may include a measure of communication signal strength or other measure of signal quality at each documented location. A remote device including, but not limited to, a smartphone, a wearable smartwatch, or a smart ring, can be used in addition to the CGM device, for example to relay the CGM data from the CGM to the pump, and the system can be configured to provide an indication of communication signal quality between the remote device, the infusion pump, and/or the CGM device to determine optimal placement of these components relative to the user.

In embodiments, the methods and systems can include a display of a human body which depicts past and/or present locations of the infusion pump and/or the CGM device relative to the user. The display can be provided directly on the infusion pump or externally on a remote device. The display can be configured to automatically update location data (i.e., live changes specific to the user) based on movement of the infusion pump and/or the CGM device relative to the user to create a map of data points corresponding to locations of, e.g., good, moderate, and weak communication signal strength between the components. This advantageously allows a user to determine optimal locations for placement of the infusion pump and/or the CGM device based on communication signal strength in as little time as possible. Additionally, the display can be configured to show and/or recommend one or more locations on the body of a user where the CGM device and/or pump should be placed for optimal CGM measurements and/or insulin absorption based on previous locations in order to avoid tissue scarring and issues with insulin absorption at recently used locations.

For example, the display can show the present location of the infusion pump on the user and provide a color-coded indication of where to place the CGM device, or vice versa, to optimize communications between the components. The color-coded indication can show, for example, green areas on the body that correspond to locations where the communication signal quality between the infusion pump and the CGM device is strong, yellow areas that correspond to locations where the communication signal quality is moderate, and red areas that correspond to locations where the communication signal quality is weak. It should be understood that different color schemes or other forms of indication can be used in place of or in addition to the green-yellow-red color scheme described by way of example, such as, a yes/no arrangement where locations having sufficient signal quality are depicted on one manner (e.g., green) and locations having insufficient signal quality are depicted in another manner (e.g., red).

Figure 9:
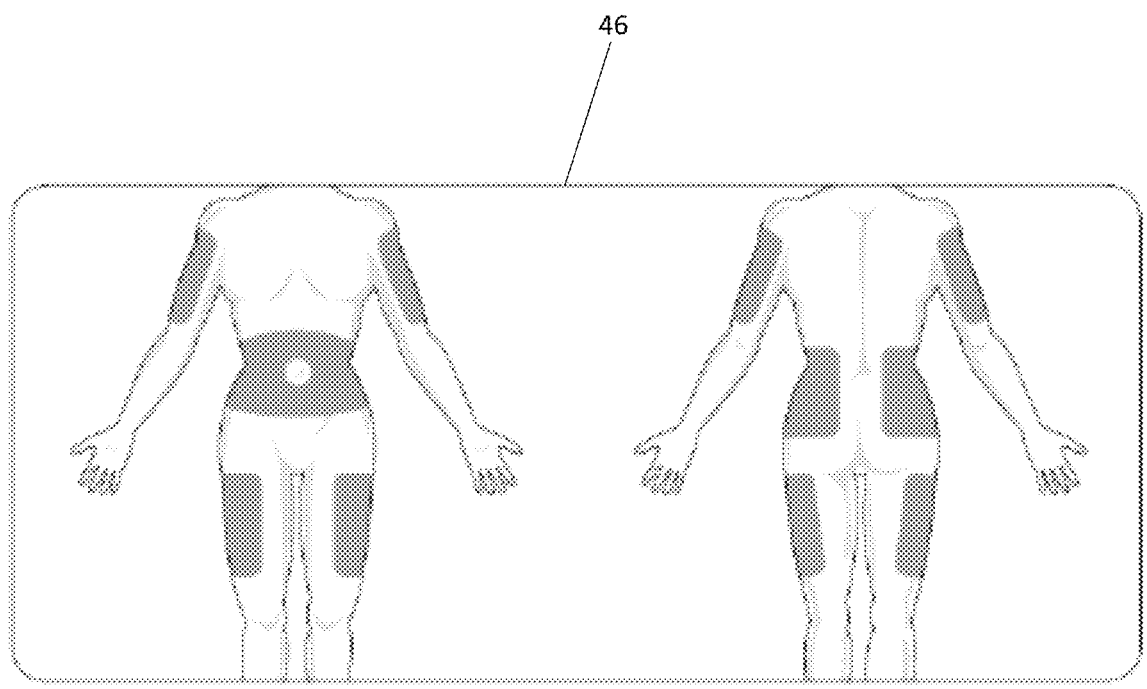
FIG. 9 depicts a user interface for use with an infusion pump system according to an embodiment of the disclosure.

FIG. 9 depicts one embodiment of a user interface 46 that could be provided on an infusion pump and/or a remote device to enable the user to select a region of the body to indicate where a new infusion set, pump and/or CGM transmitter has been inserted. In the depicted embodiment, the user interface 46 displays both front and rear views of the body with the most commonly used infusion sites highlighted. In some embodiments, the user may only be able to select the highlighted regions while in others the highlighted regions may be provided only as a guide to the user or no regions may be highlighted. In some embodiments, the user may select a general area as depicted in FIG. 9 or may be able to zoom in by selecting a given area to indicate more accurately where in the area the infusion set has been inserted. As noted above, various areas can be highlighted in different colors based on signal quality determinations due to the relative locations of devices in the system.

In embodiments, the methods and systems disclosed herein can be configured to provide a recommendation to relay a communication session between an infusion pump and a CGM device with a remote device such as a smartphone or a wearable smartwatch. Relaying the communication session through a remote device can advantageously extend the range of strong communication signal strength thus, for example, providing more green areas on the display indicating strong communication signal strength between the insulin pump, the CGM device, and/or the remote device. The system can therefore further include determining the location of a relay or repeater device in addition to the locations of the infusion pump and the CGM device. For example, a user may have a smartwatch on one side of their body and a smartphone on the other side. A set of pre-defined data points corresponding to, e.g., strong, moderate, and weak communication signal quality between the repeater, the infusion pump, the CGM device, and/or any other remote device can be based on and updated in real time or semi-real time as the location of these components changes. In embodiments, a user can first place the infusion pump and the CGM device on their body and then subsequently, based on the communication quality strength between these components, place the remote device at a location determined based on an optimal communication signal quality between the infusion pump, the CGM device, and the remote device. This can also increase power efficiency because the remote device, which can be, for example, a smartwatch or a smartphone, is a better transmitter of communication signals in regard to power consumption compared to the infusion pump or the CGM device.

In some embodiments, communication signal quality can be determined based on a signal strength between devices. For example, communication signal strength can be measured as a Received Signal Strength Indicator (RSSI) which is a measurement of the power present in a received radio signal. For example, Bluetooth® RSSI is a measure that represents the relative quality level of a Bluetooth® signal received on a device such as an infusion pump, a CGM device, or a remote device. In other embodiments, Bluetooth® Direction Finding can be utilized with or in addition to a communication signal strength measurement such as RSSI. Bluetooth® Direction Finding uses a comparison between an angle of arrival (AoA) and an angle of departure (AoD) between antennas to determine the location of where a signal is being received or transmitted. Applied to the methods and systems disclosed herein, Bluetooth® Direction Finding can be used to determine the location of a signal relative to an infusion pump, CGM device, and/or remote device so that the user is not required to manually input the location of these components.

In embodiments, communication signal quality can be determined by accumulating data points (e.g., locations on the body) that resulted in missed communication or weak communication signal strength between the components. For example, locations of an infusion pump, a CGM device, and/or a remote device can be tracked by the system and when interruptions in communications occur (e.g., missed CGM data points) the relative locations of the devices can be noted. When the user is placing the devices on the body as discussed, the indications of signal quality displayed to the user can be based on the number of missed CGM data points or other measured data relating to communication interruptions at the relative locations of the devices. In embodiments, other CGM data aspects indicative of signal quality can be tracked by the methods and systems disclosed herein, including an amount of time that the user is "in range" (e.g., above a low glucose threshold and below a high glucose threshold) with the infusion pump, CGM device, and/or remote device in various relative locations.

The methods and systems disclosed herein may include a location tracker that links at least two of the infusion pump, the CGM device, and the remote device. Location data can be shared between these components to ensure that the location of one component is not used again by another component in the next iteration of user treatment. For example, it is desirable to avoid placing the infusion pump in the same location that the CGM was previously placed to avoid, for example, tissue scarring and issues with insulin absorption and measurements of CGM data. These aspects can be linked with determining communication signal quality to optimize for several parameters simultaneously. The system can therefore in some embodiments combine tracking based both on communication signal quality and insulin absorption at various locations to provide recommendations based on better locations for both communications and insulin delivery parameters.

In some embodiments, the system can begin with a set of pre-defined data points corresponding to locations on the body where communication signal quality is known to be strong, moderate, and/or weak (e.g., a map of location data points). For example, placing the infusion pump and the CGM device on the same side of the body, such as the right side, can be classified as a coupled location data point having a strong communication signal quality because the Bluetooth® or other radio signals being transmitted between the components are not disrupted by having to pass through the body. The set of pre-defined data points can be continuously updated to correspond specifically to the user. In this manner, the map of location data points can expand or shrink based on subsequent data received indicating locations of strong, moderate, or weak communication signal quality.

In embodiments, instead of indicating optimal communication signal strength locations on a display, a user may utilize a remote device, such as a smartphone or other device having a camera, to take a picture of the user's body and subsequently have the smart device make a determination or recommendation of where the infusion pump and the CGM device should be placed. This eliminates the need for a separate display by instead relying on the remote device to provide optimal placement locations tailored specifically to the user. The determination or recommendation may include several locations ordered by communication signal quality and indicated by color as described herein. In other embodiments, an application on a smart device can include a pictogram or other illustrative diagram of the body of a user which shows locations of strong, moderate, and weak communication signal strength indicated by color. Additionally, this pictogram or other illustrative diagram can include past locations of the infusion pump and the CGM device, or the location of one of the infusion pump and the CGM device already placed on the body and a recommendation of where to place the other component.

In other embodiments, a user may utilize augmented reality (AR) to determine optimal locations for placing the infusion pump and the CGM device. For example, a user can point a camera included with a remote device, such as a smartphone, at a mirror and have optimal placement locations and/or locations of strong, moderate, and weak communication signal quality highlighted on the body of the user. In other examples, an AR headset or AR glasses can be used to assist the user in determining where to place the infusion pump and the CGM device.

In further embodiments, a smartphone or other device can use light detection and ranging (Lidar) to create a three-dimensional map of a user's body to determine optimal placement of the components. The three-dimensional map can include grid functionality placed across the user's body to help differentiate areas of strong, moderate, and weak communication signal strength.

Using a picture, pictogram, AR, or other illustrative diagrams of the body of a user advantageously creates a more personalized experience taking into account the various intricacies specific to a particular user.

It should be noted that although embodiments herein are primarily described with coordinating communications from a CGM, the communication methodologies disclosed herein can relate to other devices in infusion pump systems. For example, the disclosure can relate to additional devices such as, for example, another analyte sensing device, an activity or other health monitor, heart rate monitor, etc.

In embodiments, a method of coordinating wireless communications in an infusion pump system including a continuous glucose monitoring (CGM) device and an infusion pump can include initiating a communication session between the infusion pump and the CGM device, determining that the infusion pump is communicatively coupled to the CGM device and determining a metric indicating communication signal quality between the infusion pump and the CGM device based on a first location of the infusion pump and a first location of the CGM device relative to a user's body.

In an embodiment, the method can further include recording the metric indicating communication signal quality in a memory.

In an embodiment, the method can further include displaying on a user interface an indication of communication signal quality at one or more other locations of the infusion pump and/or one or more other locations of the CGM device relative to the user's body.

In an embodiment, displaying an indication of communication signal quality at one or more other locations of the infusion pump and/or one or more other locations of the CGM device relative to the user's body includes displaying an indication of communication signal quality at one or more other locations of the infusion pump relative to the first location of the CGM device.

In an embodiment, displaying an indication of communication signal quality at one or more other locations of the infusion pump and/or one or more other locations of the CGM device relative to the user's body includes displaying an indication of communication signal quality at one or more other locations of the CGM device relative to the first location of the infusion pump.

In an embodiment, displaying an indication of communication signal quality at one or more other locations of the infusion pump and/or one or more other locations of the CGM device relative to the user's body includes displaying on the user interface a graphical representation of the user's body identifying the locations.

In an embodiment, the indication of communication signal quality at one or more other locations of the infusion pump and/or one or more other locations of the CGM device relative to the user's body is displayed if the metric indicating communication signal quality between the infusion pump and the CGM device based on the first location of the infusion pump and the first location of the CGM device relative to a user's body is below a predetermined threshold.

In an embodiment, the method can further include comparing the metric indicating communication signal quality between the infusion pump and the CGM device based on a first location of the infusion pump and a first location of the CGM device relative to a user's body to a predetermined threshold.

In an embodiment, the method can further include providing a recommendation to move at least one of the infusion pump and the CGM device to a second location if the metric indicating communication signal quality is below the predetermined threshold.

In an embodiment, providing a recommendation to move at least one of the infusion pump and the CGM device to the second location includes displaying on a user interface a graphical representation of the user's body indicating the second location.

In an embodiment, the method can further include displaying an indication that the metric indicating communication signal quality is acceptable on a user interface if the metric indicating communication signal quality is above the predetermined threshold.

In embodiments, a method of coordinating wireless communications in an infusion pump system including a continuous glucose monitoring (CGM) device and an infusion pump can include receiving input through a user interface from a user initiating a communication session between the infusion pump and the CGM device and providing guidance on the user interface to the user on where to position at least one of the infusion pump and the CGM device relative to the user's body based on a measure of signal strength between the infusion pump and the CGM device.

In an embodiment, providing guidance on where to position at least one of the infusion pump and the CGM device relative to the user's body includes displaying a graphical representation of the user's body on the user interface.

In an embodiment, providing guidance on where to position at least one of the infusion pump and the CGM device includes displaying a metric indicating communication signal quality between the infusion pump and the CGM device at one or more previous locations of the infusion pump and CGM device on the graphical representation of the user's body.

In an embodiment, providing guidance on where to position at least one of the infusion pump and the CGM device includes displaying a metric indicating communication signal quality between the infusion pump and the CGM device at a current location of the infusion pump and a current location of the CGM device relative to a user's body on the graphical representation of the user's body.

In an embodiment, the method can further include updating the metric indicating communication signal quality between the infusion pump and the CGM device on the graphical representation of the user's body in real-time when the infusion pump or the CGM device is moved from the respective current location.

In an embodiment, providing guidance on the user interface to the user on where to position at least one of the infusion pump and the CGM device relative to the user's body based on a measure of signal strength between the infusion pump and the CGM device includes providing a recommendation for a location for one or more of the infusion pump and the CGM device relative to the user's body.

In an embodiment, providing a recommendation for a location for one or more of the infusion pump and the CGM device relative to the user's body based on a measure of signal strength between the infusion pump and the CGM device includes providing a recommendation for a location of the CGM device based on a current location of the infusion pump.

In an embodiment, providing a recommendation for a location for one or more of the infusion pump and the CGM device relative to the user's body includes providing a recommendation for a location of the infusion pump based on a current location of the CGM.

In an embodiment, providing a recommendation for a location of the infusion pump is further based on a predicted efficacy of insulin absorption at the location.

In an embodiment, providing guidance on the user interface to the user on where to position at least one of the infusion pump and the CGM device relative to the user's body based on a measure of signal strength between the infusion pump and the CGM device includes providing a color coded indication of areas of different signal strength with different colors.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Also incorporated herein by reference in their entirety are commonly owned U.S. Pat. Nos. 6,999,854; 8,133,197; 8,287,495; 8,408,421 8,448,824; 8,573,027; 8,650,937; 8,986,523; 9,173,998; 9,180,242; 9,180,243; 9,238,100; 9,242,043; 9,335,910; 9,381,271; 9,421,329; 9,486,171; 9,486,571; 9,492,608; 9,503,526; 9,555,186; 9,565,718; 9,603,995; 9,669,160; 9,715,327; 9,737,656; 9,750,871; 9,867,937; 9,867,953; 9,940,441; 9,993,595; 10,016,561; 10,201,656; 10,279,105; 10,279,106; 10,279,107; 10,357,603; 10,357,606; 10,492,141; 10/541,987; 10,569,016; 10,736,037; 10,888,655; 10,994,077; 11,116,901; 11,224,693; 11,291,763; 11,305,057; 11,458,246; 11,464,908; 11,654,236; and 11,911,595 and commonly owned U.S. Patent Publication Nos. 2009/0287180; 2012/0123230; 2013/0053816; 2014/0276423; 2014/0276569; 2014/0276570; 2018/0071454; 2019/0307952; 2020/0206420; 2020/0329433; 2020/0368430; 2020/0372995; 2021/0001044; 2021/0113766; 2022/0062553; 2022/0139522; 2022/0223250; 2022/0233772; 2022/0233773; 2022/0238201; 2022/0265927; 2023/0034408; 2022/0344017; 2022/0370708; 2022/0037465; 2023/0040677; 2023/0047034; 2023/0113545; 2023/0113755; 2023/0166037; 2023/0173170; 2023/0201452; 2023/0277765; 2023/0338653; 2023/0381406; 2024/0226423; 2024/0226424 and 2024/0277924 and commonly owned U.S. patent application Ser. Nos. 17/368,968; 17/896,492; 18/011,060; 18/071,835; 18/207,094; 18/398,543; 18/441,735; 18/474,839; 18/475,916; 18/478,552 and 18/678,130.

For purposes of interpreting the claims, it is expressly intended that the provisions of 35 U.S.C. § 112 (f) are not to be invoked unless the specific terms "means for" or "step for" are recited in a claim.

The invention claimed is:

1. A method of coordinating wireless communications in an infusion pump system including a continuous glucose monitoring (CGM) device and an infusion pump, comprising:
   initiating a communication session between the infusion pump and the CGM device;
   determining that the infusion pump is communicatively coupled to the CGM device;
   determining a first location of the infusion pump relative to a body of a user;
   determining a first location of the CGM device relative to the body of the user;
   determining a measurement of communication signal quality between the infusion pump and the CGM device as a function of a relative positioning of the first location of the infusion pump and the first location of the CGM device with respect to the body of the user.

2. The method of claim 1, further comprising recording the measurement of communication signal quality in a memory.

3. The method of claim 1, further comprising displaying on a user interface an indication of communication signal quality at one or more other locations of the infusion pump and/or one or more other locations of the CGM device relative to the body of the user.

4. The method of claim 3, wherein displaying an indication of communication signal quality at one or more other locations of the infusion pump and/or one or more other locations of the CGM device relative to the body of the user includes displaying an indication of communication signal quality at one or more other locations of the infusion pump relative to the first location of the CGM device.

5. The method of claim 3, wherein displaying an indication of communication signal quality at one or more other locations of the infusion pump and/or one or more other locations of the CGM device relative to the body of the user includes displaying an indication of communication signal quality at one or more other locations of the CGM device relative to the first location of the infusion pump.

6. The method of claim 3, wherein displaying an indication of communication signal quality at one or more other locations of the infusion pump and/or one or more other locations of the CGM device relative to the body of the user includes displaying on the user interface a graphical representation of the body of the user identifying the one or more locations.

7. The method of claim 3, wherein the indication of communication signal quality at one or more other locations of the infusion pump and/or one or more other locations of the CGM device relative to the body of the user is displayed if the measurement of communication signal quality between the infusion pump and the CGM device based on the first location of the infusion pump and the first location of the CGM device relative to the body of the user is below a predetermined threshold.

8. The method of claim 1, further comprising comparing the measurement of communication signal quality between the infusion pump and the CGM device based on a first location of the infusion pump and a first location of the CGM device relative to the body of the user to a predetermined threshold.

9. The method of claim 8, further comprising providing a recommendation to move at least one of the infusion pump and the CGM device to a second location if the measurement of communication signal quality is below the predetermined threshold.

10. The method of claim 7, further comprising displaying an indication that the measurement of communication signal quality is acceptable on the user interface if the measurement of communication signal quality is above the predetermined threshold.

11. A method of coordinating wireless communications in an infusion pump system including a continuous glucose monitoring (CGM) device and an infusion pump, comprising:
  receiving input through a user interface from a user initiating a communication session between the infusion pump and the CGM device; and
  providing guidance on the user interface to the user on where to position at least one of the infusion pump and the CGM device relative to a body of the user based on a measure of signal strength between the infusion pump and the CGM device based on a relative position of the infusion pump and the CGM device with respect to the body of the user.

12. The method of claim 11, wherein providing guidance on where to position at least one of the infusion pump and the CGM device relative to the body of the user includes displaying a graphical representation of the body of the user on the user interface.

13. The method of claim 12, where providing guidance on where to position at least one of the infusion pump and the CGM device includes displaying a measurement of communication signal quality between the infusion pump and the CGM device at one or more previous locations of the infusion pump and CGM device on the graphical representation of the body of the user.

14. The method of claim 12, where providing guidance on where to position at least one of the infusion pump and the CGM device includes displaying a measurement of communication signal quality between the infusion pump and the CGM device at a current location of the infusion pump and a current location of the CGM device relative to the body of the user on the graphical representation of the user's body.

15. The method of claim 14, further comprising updating the measurement of communication signal quality between the infusion pump and the CGM device on the graphical representation of the body of the user in real-time when the infusion pump or the CGM device is moved from the current location.

16. The method of claim 11, providing guidance on the user interface to the user on where to position at least one of the infusion pump and the CGM device relative to the body of the user based on a measure of signal strength between the infusion pump and the CGM device includes providing a recommendation for a location for one or more of the infusion pump and the CGM device relative to the body of the user.

17. The method of claim 16, wherein providing a recommendation for a location for one or more of the infusion pump and the CGM device relative to the body of the user based on a measure of signal strength between the infusion pump and the CGM device includes providing a recommendation for a location of the CGM device based on a current location of the infusion pump.

18. The method of claim 16, wherein providing a recommendation for a location for one or more of the infusion pump and the CGM device relative to the body of the user includes providing a recommendation for a location of the infusion pump based on a current location of the CGM device.

19. The method of claim 18, wherein providing a recommendation for a location of the infusion pump is further based on a predicted efficacy of insulin absorption at the location.

20. The method of claim 11, wherein providing guidance on the user interface to the user on where to position at least one of the infusion pump and the CGM device relative to the body of the user based on a measure of signal strength between the infusion pump and the CGM device includes providing a color coded indications of areas of different signal strength with different colors.

* * * * *